Dec. 22, 1964 F. MARTORELLI Re. 25,703

DISPENSER TAP

Original Filed Oct. 1, 1959

Frank Martorelli

INVENTOR.

BY Clarence A. O'Brien and Harvey R. Jacobson

Attorneys

United States Patent Office

Re. 25,703

Reissued Dec. 22, 1964

25,703

DISPENSER TAP

Frank Martorelli, % Joseph Falco, 310–16 Hills Bldg., Syracuse, N.Y.

Original No. 3,052,386, dated Sept. 4, 1962, Ser. No. 843,795, Oct. 1, 1959. Application for reissue Aug. 30, 1963, Ser. No. 305,905

4 Claims. (Cl. 222—517)

Matter enclosed in heavy brackets [ ] appears in the original patent but forms no part of this reissue specification; matter printed in italics indicates the additions made by reissue.

This invention relates to an attachment for bottles or other containers by which to function as a closure and dispenser.

An object of the invention is to provide a unique closure for beverage containers, regardless of the type of beverage, whereby the contents of the container may be easily dispensed.

Briefly, the invention is embodied in a closure adapted to fit onto the neck or discharge orifice part of a bottle and form a continuation thereof. A valve member constitutes part of a closure and it is adapted to be swung between open and closed positions enabling the contents of the bottle or other container to be discharged therefrom into an awaiting receptacle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
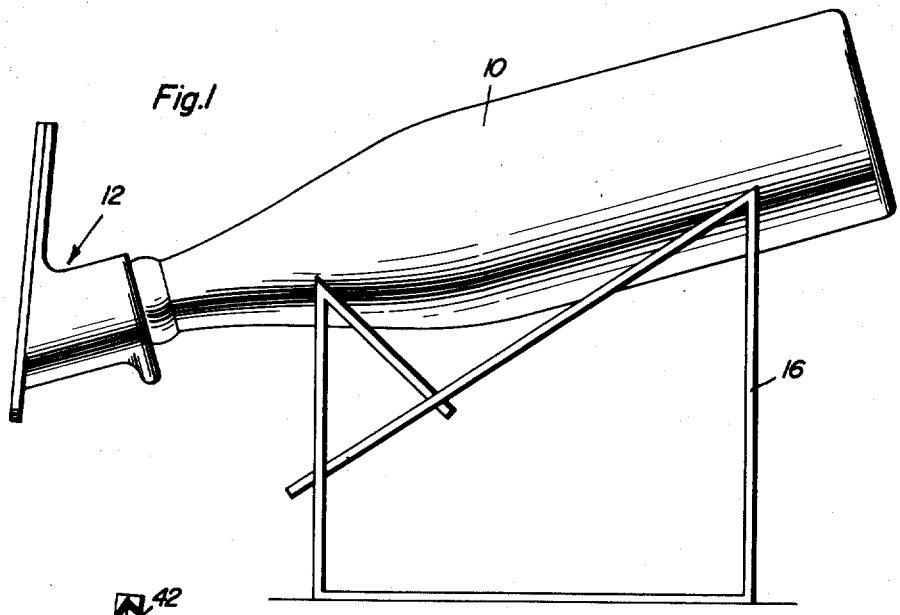
FIGURE 1 is a side elevational view of a typical container supported on a stand and equipped with a closure in accordance with the invention.

In the accompanying drawings there is a container 10 diagrammatically representing any type of container capable of having closure 12 attached thereto. The preferable place of attachment is at the discharge orifice 14, which is usually a neck of a bottle or can. A stand 16 shows that the container 10 may be supported at an incline so the contents thereof flow by gravity through port 14.

Closure 12 is made of a circular tube or sleeve 18 having an open end 20 with finger-grip 22 protruding laterally therefrom at open end 20. A circumferential groove 24 is formed in the bore 26 of sleeve 18 by which to snap onto the bead at the outer end of a conventional container neck. Sleeve 18 constitutes the body of the closure and it is preferably made of an elastomeric or at least, flexible plastic substance, for example polyethylene.

Figure 2:
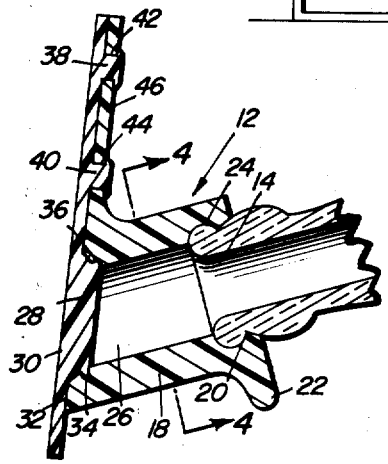
FIGURE 2 is a longitudinal sectional view of the closure used in FIGURE 1.
Figure 3:
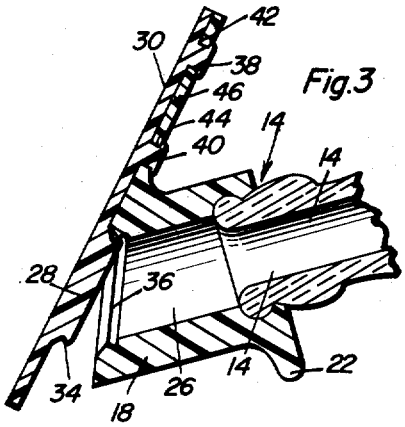
FIGURE 3 is a sectional view similar to FIGURE 2 but showing the valve element in the open position.
Figure 4:
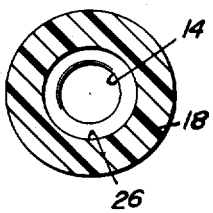
FIGURE 4 is a cross-sectional view taken on the line 4—4 of FIGURE 2.
Figure 5:
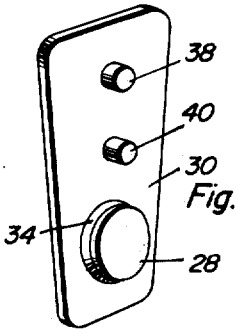
FIGURE 5 is a perspective view of a part of the closure.

Valve member 28 is shaped in the form of a disk or plug and protrudes outwardly from one surface of a flat, elongated plate 30. The valve member and flat plate are each made of plastic, for instance polyethylene or polystyrene or others. As seen in FIGURES 2 and 3 the front surface or forward end 32 of the body of the closure is beveled in a plane inclined with respect to the longitudinal axis of sleeve 18 so that when the liquid substance from the container flows through the closure, it is directed by gravity downwardly and outwardly of said sleeve.

Valve member or element 28 has a short circular rib 34 at its periphery designed to snap into a shallow circumferential groove 36 which is formed in the bore 26 and which cooperates with rib 34 to form a seal. The plate 30 has a pair of rivets 38 and 40 on the same face thereof as valve member 28, and these are passed through a pair of openings 42 and 44 in an inclined arm 46 which extends upwardly and rearwardly from said sleeve 18 at the discharge end thereof. Arm 46 is made of the same elastomeric substance as sleeve 18 and is integral therewith. Being elastomeric, the arm 46 has an inherent amount of resilience and elasticity which tends to return the plate 30 to the closed position i.e. with valve member 28 occupying the discharge end of bore 26, said arm being constantly under tension.

In assembly the only steps required are to place the rivets 40 and 38 into openings 44 and 42 and to heat seal them in place.

In use, the sleeve is snapped onto the neck of the container as shown in FIGURES 2 and 3 and the container held at an inclined position, for example by a stand 16. Then, when it is desired to dispense liquid from the container, the upper part of arm 46 and plate 30 which is secured thereto, are deflected to the position shown in FIGURE 3 at which the sealing groove 36 and sealing rib 34 becomes separated and the valve member 28 becomes separated from the discharge end of bore 26. The liquid contents of the bottle are then capable of flowing through the closure in an amount selected by the user, who closes the valve when the desired quantity of liquid is dispensed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A closure for a container which has a discharge opening member, said closure comprising a body having a bore, means at one end of said bore for attaching the body to the container member with said bore in registry with the dscharge opening of the container member, a valve member, resilient means supporting said valve member in liquid flow controlling relationship with said bore, said resilient means including a self-sustaining supporting arm of resilient substance integral with said body and protruding laterally therefrom in the plane of the other end of the body, mechanical means securing said valve member to said arm, said arm being tensioned and yieldingly retaining the valve member in closed position, and sealing means connected between said valve member and the discharge end of said bore, said arm having longitudinally spaced openings therein, said mechanical means including spaced rivets on the valve member engaged in the openings.

2. A dispensing closure comprising a resilient tube for mounting on a container, said tube including a bevelled forward end, a resilient, inclined arm integral with said tube and extending upwardly and rearwardly therefrom in the plane of said bevelled forward end thereof, said arm having longitudinally spaced openings therein, an elongated plate mounted longitudinally on and carried by said arm and extending downwardly and forwardly therefrom in opposed parallelism with said bevelled end of said tube and yieldingly engaged therewith by said arm, a valve on the lower portion of the plate engageable in the tube, and rivets formed integrally with the plate at longitudinally spaced points and anchored in the openings for fixedly securing said plate to the arm, said arm being tensioned by the plate when said plate is engaged with said tube.

*3. In a closure structure, the combination of a body member having a bore provided therein one end of which serves as a discharge end, a closure tiltable relative to said body member to and from a position closing said discharge end, an arm on said closure for manipulating the same, and resilient hinge means supporting said closure in tiltable relationship to said body member, said resilient hinge means having a connecting portion integral with one of sad arm and body members and attached to the other of said members, the connecting portion being resilient and pretensioned to hold said closure yieldingly in closed position and being tensioned further in the opening of said closure to return it to closed position.*

*4. A closure for a container, the closure structure comprising a plastic body member having a bore provided therein one end of which serves as a discharge end, the other end of said body being connectable with the container, a closure fitting on and closing said discharge end and tiltable relative to said body member to and from closed position, a plastic arm on said closure for manipulating the same, and resilient plastic hinge means supporting said closure in tiltable relationship to said body member, said resilient hinge means being integral with said body and arm members and being pretensioned to hold said closure yieldingly in closed position and being tensioned further in the opening of the closure to return said closure to closed position.*

References Cited by the Examiner

The following references, cited by the Examiner, are of record in the patented file of this patent or the original patent.

UNITED STATES PATENTS

| | | | |
|---|---|---|---|
| 2,111,186 | 3/38 | Jenks | 222—498 |
| 2,272,798 | 2/42 | Hacmac | 222—517 |
| 2,886,218 | 5/59 | Marcus | 222—517 |

LOUIS J. DEMBO, *Primary Examiner.*

EUGENE F. BLANCHARD, *Examiner.*